United States Patent
Liu et al.

(10) Patent No.: US 10,067,237 B1
(45) Date of Patent: Sep. 4, 2018

(54) METHOD AND APPARATUS FOR GEO-FENCE DETECTION

(71) Applicant: Marvell International Ltd., Hamilton (BM)

(72) Inventors: BoChih Liu, Shanghai (CN); Zhike Jia, Fremont, CA (US); Jian Chen, Shanghai (CN); Jing Yu, Shanghai (CN); Mobo Qiu, Shanghai (CN)

(73) Assignee: Marvell International Ltd., Hamilton (BM)

( * ) Notice: Subject to any disclaimer, the term of this patent is extended or adjusted under 35 U.S.C. 154(b) by 284 days.

(21) Appl. No.: 15/056,569

(22) Filed: Feb. 29, 2016

Related U.S. Application Data

(63) Continuation-in-part of application No. 14/643,670, filed on Mar. 10, 2015.

(60) Provisional application No. 62/138,048, filed on Mar. 25, 2015, provisional application No. 61/951,769, filed on Mar. 12, 2014.

(51) Int. Cl.
  *G01S 19/52* (2010.01)
  *G01S 19/42* (2010.01)
  *G01S 19/34* (2010.01)

(52) U.S. Cl.
  CPC .............. *G01S 19/52* (2013.01); *G01S 19/34* (2013.01); *G01S 19/42* (2013.01)

(58) Field of Classification Search
  CPC .......... G01S 19/09; G01S 19/28; G01S 19/34; G01S 19/42; G01S 19/52
  USPC .................................................... 342/357.25
  See application file for complete search history.

(56) References Cited

U.S. PATENT DOCUMENTS

| | | | |
|---|---|---|---|
| 7,072,668 B2 * | 7/2006 | Chou | G01S 5/0027 342/357.4 |
| 7,574,292 B2 * | 8/2009 | Hoeffel | B60T 8/172 152/456 |
| 8,442,760 B2 * | 5/2013 | Watanabe | G01C 21/28 701/431 |
| 8,467,967 B2 * | 6/2013 | Loomis | B60R 11/0241 342/357.2 |
| 9,215,560 B1 * | 12/2015 | Jernigan | H04W 4/021 |
| 9,696,429 B2 * | 7/2017 | Turon | G01S 19/34 |

* cited by examiner

*Primary Examiner* — Harry K Liu

(57) ABSTRACT

Aspects of the disclosure provide an apparatus that includes a sensor module and a navigation signal receiver. The sensor module is configured to generate signals indicative of motions of the apparatus. The navigation signal receiver includes receiver circuitry and processor circuitry. The receiver circuitry is configured to receive satellite navigation signals from a plurality of satellites. The processor circuitry is configured to determine a velocity of the apparatus based on the satellite navigation signals, receive an estimated speed from the sensor module, calibrate a moving speed based on the velocity and the estimated speed, and determine a power saving time based on the calibrated moving speed. The power saving time is an amount of time that the navigation signal receiver is to stay in a power saving mode.

15 Claims, 7 Drawing Sheets

METHOD AND APPARATUS FOR GEO-FENCE DETECTION

INCORPORATION BY REFERENCE

This application claims the benefit of U.S. Provisional Application No. 62/138,048, "GEO-FENCE ENTRY DETECTION" filed on Mar. 25, 2015, and is a continuation-in-part of U.S. patent application Ser. No. 14/643,670, "METHOD AND APPARATUS FOR GEO-FENCE DETECTION" filed on Mar. 10, 2015, which in turn claims the benefit of U.S. Provisional Application No. 61/951,769, "Geofencing Detection Method Based on Global Navigation Satellite System" filed on Mar. 12, 2014. The entire disclosures of the prior applications are incorporated herein by reference in their entirety.

BACKGROUND

The background description provided herein is for the purpose of generally presenting the context of the disclosure. Work of the presently named inventors, to the extent the work is described in this background section, as welt as aspects of the description that may not otherwise qualify as prior art at the time of filing, are neither expressly nor impliedly admitted as prior art against the present disclosure.

A geo-fence is a virtual perimeter for a real-world geographic area. The geo-fence can be used by location-aware devices to detect Whether the location-aware devices enter or exit the geographic area. In an example, a location-aware device detects present location information of the device, such as latitude, longitude, altitude and the like of the device, compares the present location information with a geo-fence for a geographic area to determine whether the location-aware device is inside the geo-fence or outside geo-fence.

SUMMARY

Aspects of the disclosure provide an apparatus that includes a sensor module and a navigation signal receiver. The sensor module is configured to generate signals indicative of motions of the apparatus. The navigation signal receiver includes receiver circuitry and processor circuitry. The receiver circuitry is configured to receive satellite navigation signals from a plurality of satellites. The processor circuitry is configured to determine a velocity of the apparatus based on the satellite navigation signals, receive an estimated speed from the sensor module, calibrate a moving speed based on the velocity and the estimated speed, and determine a power saving time based on the calibrated moving speed. The power saving time is an amount of time that the navigation signal receiver is to stay in a power saving mode.

In an embodiment, the processor circuitry is configured to turn off the receiver circuitry in the power saving mode. Further, the processor circuitry is configured to detect a slow motion of the circuit based on a signal from the sensor module, and calibrate the moving speed based on the estimated speed from the sensor module. In an example, the processor circuitry is configured to predict, based on the calibrated moving speed, a time duration without a geo-fence event, and determine the power saving time based on the time duration.

According to an aspect of the disclosure, the processor circuitry is configured to determine a position of the apparatus based on the received satellite navigation signals, and detect a geo-fence event when the apparatus crosses a border of a geo-fence area based on the position. In an embodiment, the processor circuitry is configured to calculate a distance between the position and a center position of the geo-fence area, and determine whether the circuit is in/out of the geo-fence area. Then, the processor circuitry is configured to signal an application processor when the apparatus crosses the border of the geo-fence area.

Aspects of the disclosure provide a method for geo-fence detection. The method includes detecting a motion mode of a device, receiving an estimated speed from a sensor module in the device, calibrating a moving speed of the device in the motion mode based on a velocity and the estimated speed from the sensor module, and determining a power saving time based on the calibrated moving speed. The velocity is determined based on satellite navigation signals. The power saving time is an amount of time that the device is to stay in a power saving mode.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
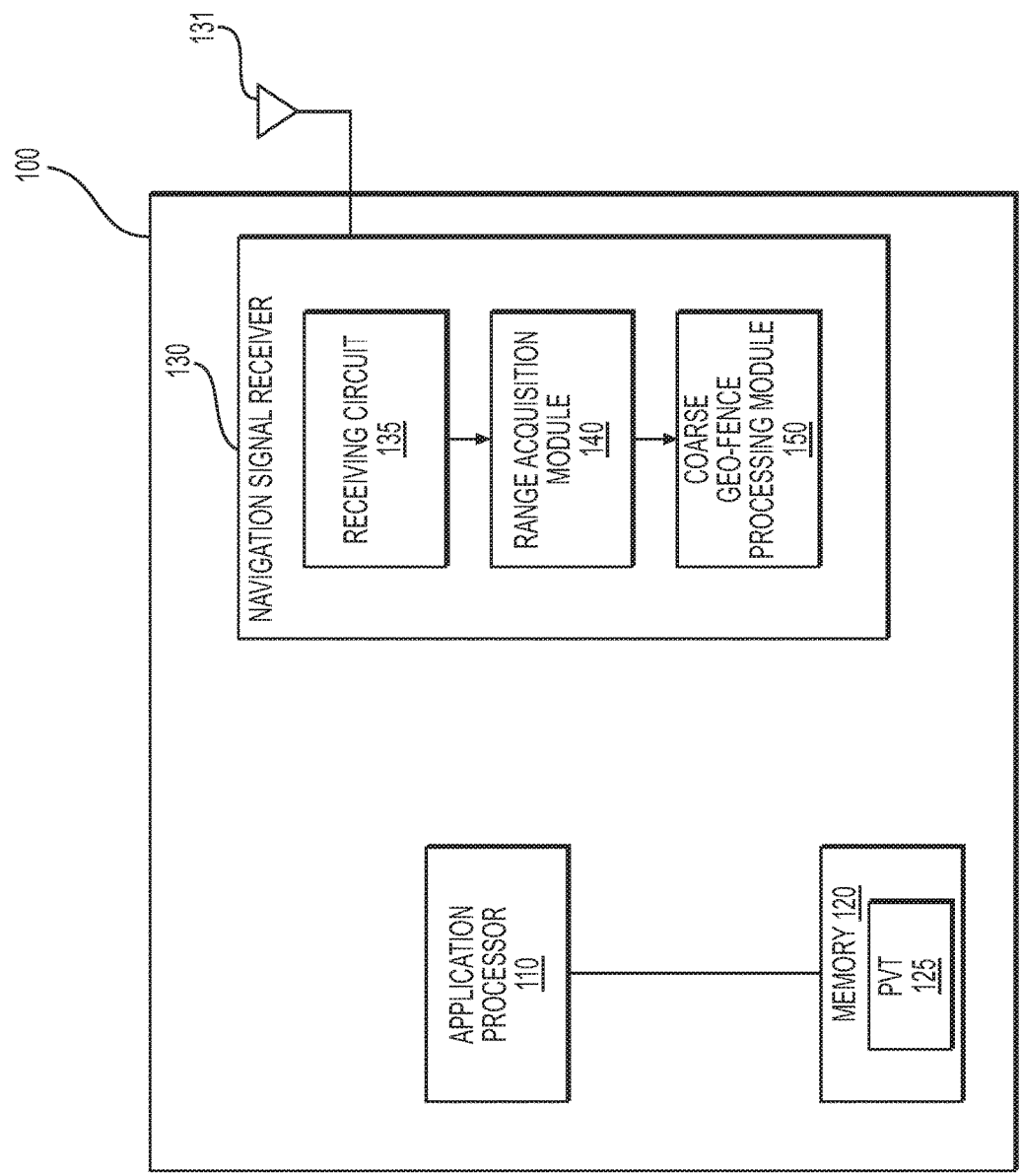
FIG. 1 shows a block diagram of an electronic device 100 according to an embodiment of the disclosure.

FIG. 1 shows a block diagram of an electronic device 100 according to an embodiment of the disclosure. The electronic device 100 includes a navigation signal receiver 130 configured to receive and process signals from a satellite navigation system. Further, the navigation signal receiver 130 is configured to perform a geo-fence detection, such as a coarse geo-fence detection, that does not require location computation.

The electronic device 100 can be any suitable device, such as a tablet computer, a smart phone, a camera, a wearable device, and the like. The electronic device 100 is configured to execute an application that requires geo-fence detection. Generally, a geo-fence is a virtual perimeter for a real-world geographic area, and the geo-fence detection compares location information of a device with the geo-fence to determine whether the device is inside the geo-fence or outside the geo-fence.

In an example, the electronic device 100 is a smart phone 100 belonging to a user Who has subscribed an information service from a business owner. The smart phone 100 executes a mobile application, for example, provided by the business owner. The mobile application includes a geo-fence defined around a geographic area, such as a business location of the business owner and the like, and the smart phone 100 executes the mobile application to perform geo-fence detection periodically, such as once per second and the like, to detect a geo-fence event, such as entering the geo-fence, exiting the geo-fence. When the user with the smart phone 100 enters or exits the geographic area, the smart phone 100 detects the geo-fence event, and informs a server (not shown) that provides the information service. In an example, the server provides a push notification to the smart phone 100 in response to the geo-fence event.

In another example, the electronic device 100 is a wearable device 100 that can be attached to a child. In an embodiment, the wearable device 100 executes an application having a geo-fence defined around a geographic area, such as a day care center, and the like, and the wearable device 100 performs geo-fence detection periodically, such as five times per second, and the like, to detect a geo-fence event, such as the child entering or exiting the day care center. In an example, when a child is dropped off at the day care center, the wearable device 100 is attached to the child and is activated. When the child exits the day care center by accident, in an example, the wearable device 100 detects the geo-fence event, and operates in response to the geo-fence event. In an example, the wearable device 100 sends out an audio alarm. In another example, the wearable device 100 transmits wireless signals that can generate alarm signals, for example, on a monitoring device of the day care center and/or a mobile device with the child's parent.

Location information can be detected from various sources, such as from a satellite navigation system, a cellular network, a Wi-Fi network, and the like. In the FIG. 1 example, the navigation signal receiver 130 is able to receive and process satellite navigation signals, and location information can be calculated from the satellite navigation signals.

In an example, satellite navigation based location calculation relies on position, velocity and time (PVT) calculation, and requires significant amount of computation resource. In an example, the PVT calculation uses a recursive algorithm that requires certain computation resource, such as a processing speed, a cache speed, a cache size, and the like. According to an aspect of the disclosure, the navigation signal receiver 130 is implemented at a relatively low cost and does not have enough computation resource, such as not enough processing speed, not enough cache speed, not enough cache size, and the like, to perform the PVT calculation.

In an embodiment, the electronic device 100 includes another circuit with enough computation resource for PVT calculation. In the FIG. 1 example, the electronic device 100 includes an application processor 110 having the computation resource for PVT calculation. The application processor 110 is configured to be able to execute various applications. The electronic device 100 includes a memory 120 storing software instructions of applications, and the application processor 110 can execute the software instructions to run the applications on the electronic device 100. In the FIG. 1 example, the memory 120 stores software instructions 125 for PVT calculation. The application processor 110 can execute the software instructions 125 to receive information from the navigation signal receiver 130, calculate position, velocity and time, determine the location of the electronic device 100, and can perform location based applications.

In an embodiment, the electronic device 100 is a battery-powered device. In order to save power, the application processor 110 is configured to have an active mode and a power saving mode. In the active mode, the application processor 110 is able to execute software instructions. When the application processor 110 is idle, the application processor 110 enters the power saving mode to save power.

According to an aspect of the disclosure, the electronic device 100 is configured to execute a geo-fence based application that requires geo-fence detection regularly, such as at a frequency of one or more times per second and the like. In the electronic device 100, the navigation signal receiver 130 receives the satellite navigation signals, processes the satellite navigation signals and performs a coarse geo-fence detection without location computation at the frequency. In an example, the coarse geo-fence detection without location computation has a lower accuracy compared to a geo-fence detection that is based on PVT computation. When the navigation signal receiver 130 detects a geo-fence event in the coarse geo-fence detection, the navigation signal receiver 130 signals the application processor 110, and the application processor 110 performs a geo-fence detection that is based on PVT computation to confirm or deny the geo-fence event. Thus, the application processor 110 (performs the PVT based geo-fence detection at a reduced frequency, such as once per minute, and the like. Thus, the application processor 110 has more idle time and is more likely to enter the power saving mode to save power.

In the FIG. 1 example, the electronic device 100 includes an antenna 131 configured to generate electrical signals in response to electromagnetic waves in the air. In an embodiment, the antenna 131 is configured to generate satellite navigation signals in response to electromagnetic waves emitted by satellites in a satellite navigation system. In an example, a global navigation satellite system (GNSS) includes multiple satellites (not shown) that provide a global coverage on the Earth. Each satellite transmits electromagnetic waves carrying ephemeris for the satellite, such as a code designated for the satellite. In an embodiment, the code can be used to determine a distance from the electronic device 100 to the satellite, and the distance is used in the coarse geo-fence detection.

Specifically, the navigation signal receiver 130 includes a receiving circuit 135, a range acquisition module 140 and a coarse geo-fence processing module 150. These elements are coupled together as shown in FIG. 1.

The receiving circuit 135 is coupled to the antenna 131 to receive an electrical signal generated in response electromagnetic waves in the air. The receiving circuit 135 includes suitable circuits to process the electrical signal and obtain a digital signal from the electrical signal. In an example, the receiving circuit 135 includes various analog circuits (not shown), such as amplifier, filter, down-converter and the like to process the electrical signal using analog processing techniques. In addition, the receiving circuit 135 includes an analog-to-digital converter (ADC) (not shown) that converts the processed analog signal to a digital signal. From the digital signal, a digital sequence, such as a binary sequence, can be obtained. In an example, the digital sequence includes codes designated for multiple satellites.

The range acquisition module 140 is configured to determine distances from the electronic device 100 to one or more satellites. In an embodiment, the range acquisition module 140 is configured to identify, from the digital sequence, codes designated for the satellites. In an example, a code designated for a satellite has a relatively large number of bits, such as about 720 gigabytes. For example, the code repeats once a week when the code is transmitted at 10.23 Mbit/s. Further, in an example, when the range acquisition module 140 receives a code designated for a satellite, the range acquisition module 140 determines a time the code taken from the satellite to the electronic device 100.

In an example, the electronic device 100 maintains a reference code based on a local clock at the electronic device 100. It is noted that the local clock at the electronic device 100 may be different from a clock used by a satellite due to clock drifting. The range acquisition module 140 compares the received code with the reference code maintained at the electronic device 100 to determine a number of bit shifts. In the example, based on the code transmission speed and the number of bit shifts, the range acquisition module 140 determines the time the code has taken from the satellite to the electronic device 100. Then, in an example, the range acquisition module 140 multiplies the speed of light by the time to obtain a distance from the satellite to the electronic device 100. In an example, the distance is referred to as pseudo-distance. The pseudo distance is different from the real distance between the satellite and the electronic device 100 due to, for example, clock drifting, errors in the measurement, and the like.

The coarse geo-fence (processing module 150 includes suitable circuit to perform a coarse geo-fence detection that detects whether the electronic device 100 is inside a detection area or outside of a detection area based on the pseudo-distance, a minimum distance from the detection area to the satellite, and a maximum distance from the detection area to the satellite. In an embodiment, the coarse geo-fence detection does not need to determine the location of the electronic device 100 and does not need to perform PVT computation. The coarse geo-fence detection is described in detail with reference to FIG. 2.

In an embodiment, the navigation signal receiver 130 and the application processor 110 are implemented on different integrated circuit (IC) chips. In another embodiment, the navigation signal receiver 130 and the application processor 110 are implemented as two circuit blocks integrated on an IC chip.

Figure 2:
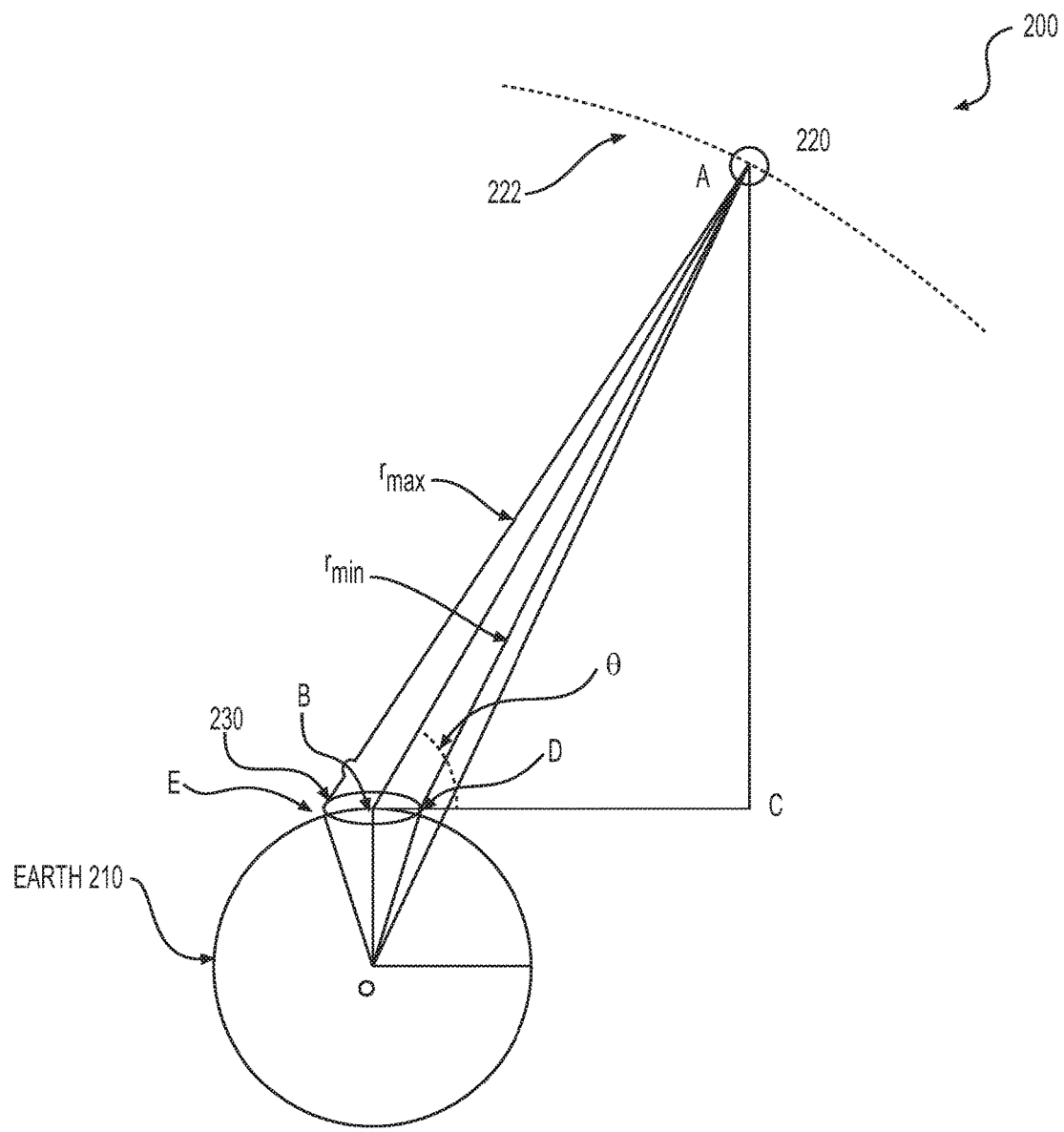
FIG. 2 shows a plot 200 for illustrating geo-fence detection according to an embodiment of the disclosure.

FIG. 2 shows a plot 200 for illustrating a coarse geo-fence detection according to an embodiment of the disclosure. The coarse geo-fence detection is based on pseudo-distance and does not need to calculate accurate location.

The plot 200 shows Earth 210 as a circle, and the center of Earth 210 is shown as point O. The plot 200 shows a satellite 220 at point A of an orbit 222. Further, the plot 200 shows a circle 230 on the surface of Earth 210. The center of the circle 230 is shown as point II in an example, the area in the circle 230 is a detection area defined for a coarse geo-fence detection.

In FIG. 2, point C is a vertical projection of the satellite 220 on the plane of the circle 230, point D is a near cross point of line BC and the circle 230, and point E is a far cross point of line 13C and the circle 230. The distance from the point D to the satellite 220 is the minimum distance ($r_{min}$) from the circle 230 to satellite 220, and the distance from the point E to the satellite 220 is the maximum distance ($r_{max}$) from the circle 230 to the satellite. An angle θ between AB and BC has a value from 0 to π/2. In an example, the angle θ, the minimum distance $r_{min}$ and the maximum distance $r_{max}$ are calculated according to equations 1-3:

$$\theta = \sin^{-1}\left(\frac{AB^2 + BO^2 - AO^2}{2AB \cdot BO}\right) \quad (1)$$

$$r_{min} = \begin{cases} \sqrt{AB^2 + R^2 - 2R \cdot AB \cdot \cos\theta}, & AB \cdot \cos\theta \geq R \\ AB \cdot \sin\theta, & AB \cdot \cos\theta < R \end{cases} \quad (2)$$

$$r_{max} = \sqrt{AB^2 + R^2 + 2R \cdot AB \cdot \cos\theta} \quad (3)$$

where AB denotes the distance between satellite 220 and the center B of the circle 230, BO denotes the distance between the center B of the circle 230 and the center O of Earth 210, AO denotes the distance between satellite 220 and the center O of Earth 210, and R denotes the radius of the circle 230.

It is noted that Earth 210 and the satellite 220 move relatively, and the minimum distance $r_{min}$ and the maximum distance $r_{max}$ change over time. In an embodiment, at a first time $t_0$, the minimum distance $r_{min}(t_0)$ and the maximum distance $r_{max}(t_0)$ are calculated, for example, based on PVT calculation, and at a second time $t_1$ later than the first time $t_0$ (e.g., one second to one minute later than the first time $t_0$), the minimum distance $r_{min}(t_1)$ and the maximum distance $r_{max}(t_1)$ are calculated without PVT calculation, for example using equations 4 and 5:

$$r_{max}(t_1) = r_{max}(t_0) + dr_{max} \cdot (t_1 - t_0) + \frac{1}{2}ddr_{max} \cdot (t_1 - t_0)^2 \quad (4)$$

$$r_{min}(t_1) = r_{min}(t_0) + dr_{min} \cdot (t_1 - t_0) + \frac{1}{2}ddr_{min} \cdot (t_1 - t_0)^2 \quad (5)$$

where $dr_{max}$ denotes a change speed of the maximum distance at the first time $t_0$, $ddr_{max}$ denotes a change acceleration of the maximum distance at the first time $t_0$, $dr_{min}$ denotes a change speed of the minimum distance at the first time $t_0$, and $ddr_{min}$ denotes a change acceleration of the minimum distance at the first time $t_0$. The parameters $dr_{max}$, $ddr_{max}$, $dr_{min}$, and $ddr_{min}$ can be calculated at the first time $t_0$, for example, based on PVT calculation.

According to an aspect of the disclosure, at the second time $t_1$, when the electronic device 100 is in the circle 230, the distance from the electronic device 100 to the satellite 220 is longer than the minimum distance and shorter than the maximum distance from the detection area to the satellite 220, such as shown in the inequality 6:

$$r_{min}(t_1) < r(t_1) < r_{max}(t_1) \quad (6)$$

where $r(t_1)$ denotes the real distance from the electronic device 100 to the satellite 220.

Further, according to an aspect of the disclosure, the electronic device 100 is configured to calculate a pseudo-distance without PVT calculation at the second time $t_1$. In an example, the relationship of the pseudo-distance and the real distance can be expressed as shown in equation 7:

$$r(t_1) = \rho(t_1) - \rho_{clk}(t_1) - e(t_1) \quad (7)$$

where $\rho(t_1)$ denotes the pseudo-distance from the electronic device 100 to the satellite 220, $\rho_{clk}(t_1)$ denotes the pseudo-distance bias caused by receiver local clock bias at the electronic device 100, $e(t_1)$ is the pseudo-distance measurement error.

It is noted that, in an example, the electronic device 100 receives signals from multiple satellites (not shown). The electronic device 100 respectively performs similar calculations as for the satellite 220 for the multiple satellites. In an embodiment, when the electronic device 100 is inside the circle 230, for each satellite, the real distance from the electronic device 100 to the satellite is longer than the minimum distance between the circle 230 and the satellite, and is shorter than the maximum distance between the circle 230 and the satellite. However, for at least one satellite, when the real distance from the electronic device 100 to the satellite is shorter than the minimum distance between the circle 230 and the satellite, or when the real distance from the electronic device 100 to the satellite is longer than the maximum distance between the circle 230 and the satellite, the electronic device 100 is outside the circuit 230.

In another embodiment, the coarse geo-fence detection is based on overlapping of clock skew and overlapping of clock drift calculation. In an example, for each satellite j from Which the electronic device 100 receives a satellite navigation signal, a minimum pseudo-distance bias and a maximum pseudo-distance bias caused by the local clock bias at the electronic device 100, are calculated, according to equations 8 and 9:

$$\rho_{clk\_min\_j}(t_1) = \rho_j(t_1) - e_j(t_1) - r_{max\_j} \quad (8)$$

$$\rho_{clk\_max\_j}(t_1) = \rho_j(t_1) - e_j(t_1) - r_{min\_j} \quad (9)$$

where $\rho_{clk\_min}{}^j$ denotes the minimum pseudo-distance bias with respect to satellite j, $\rho_{clk\_max}(t_1)$ denotes the maximum pseudo-distance bias with respect to satellite j, $\rho_j(t_1)$ denotes the pseudo-distance between the electronic device 100 and the satellite j, $e_j(t_1)$ denotes the pseudo-distance measurement error with respect to satellite j, $r_{min\_j}(t_1)$ denotes the minimum distance between the circle 230 and the satellite j, and $r_{max\_j}(t_1)$ denotes the maximum distance between the circle 230 and the satellite j. Further, the overlapping of clock skew ($O_{skew}$) is calculated according to equation 10:

$$O_{skew} = \min_{all\,j}(\rho_{clk\_max\_j}(t_1)) - \max_{all\,j}(\rho_{clk\_min\_j}(t_1)) \quad (10)$$

It is noted that the overlapping of clock skew can be calculated without PVT calculation. In an example, the pseudo-distances between the electronic device 100 and the satellites are calculated by the range acquisition module 140 without PVT calculation, the minimum distances between the circle 230 and the satellites, and the maximum distances between the circle 230 and the satellites can be calculated based on equations 4 and 5 without PVT calculation, and the pseudo-distance measurement error can be cancelled out and does not need to be known. Thus, the overlapping of clock skew can be calculated without PVT calculation. When the overlapping of clock skew is equal to or larger than zero, the electronic device 100 is inside the circle 230; otherwise, the electronic device 100 is outside the circle 230.

Further, in an example, a minimum pseudo-distance shift and a maximum pseudo-distance shift caused by the local clock drift at the electronic device 100, are calculated, according to equations 11 and 12:

$$\Delta\rho_{clk\_min\_j}(t_1) = \Delta\rho_j(t_1) - \Delta e_j(t_1) - [r_{max\_j}(t_1) - r_j(t_0)] \quad (11)$$

$$\Delta\rho_{clk\_max\_j}(t_1) = \Delta\rho_j(t_1) - \Delta e_j(t_1) - [r_{min\_j}(t_1) - r_j(t_0)] \quad (12)$$

where $\Delta\rho_j(t_1)$ denotes pseudo-distance change and is calculated as $\Delta\rho_j(t_1) = \rho_j(t_1) - \rho_j(t_0)$, $\Delta e_j(t_1)$ denotes the pseudo-distance measurement error change from time $t_0$ to $t_1$. Further, the overlapping of clock drift ($O_{drift}$) is calculated according to equation 13:

$$O_{drift} = \min_{all\,j}(\Delta\rho_{clk\_max\_j}(t_1)) - \max_{all\,j}(\Delta\rho_{clk\_min\_j}(t_1)) \quad (13)$$

It is noted that, similar to the overlapping of clock skew, the overlapping of clock drift can be calculated without PVT calculation. When the overlapping of clock drift is equal or larger than zero, the electronic device 100 is inside the circle 230; otherwise, the electronic device 100 is outside the circle 230.

The coarse geo-fence detection discussed with reference to FIG. 2 can be used in various applications to release the application processor 110 from too much PVT computation, such that the application processor 110 is more likely to enter the power save mode.

Figure 3:
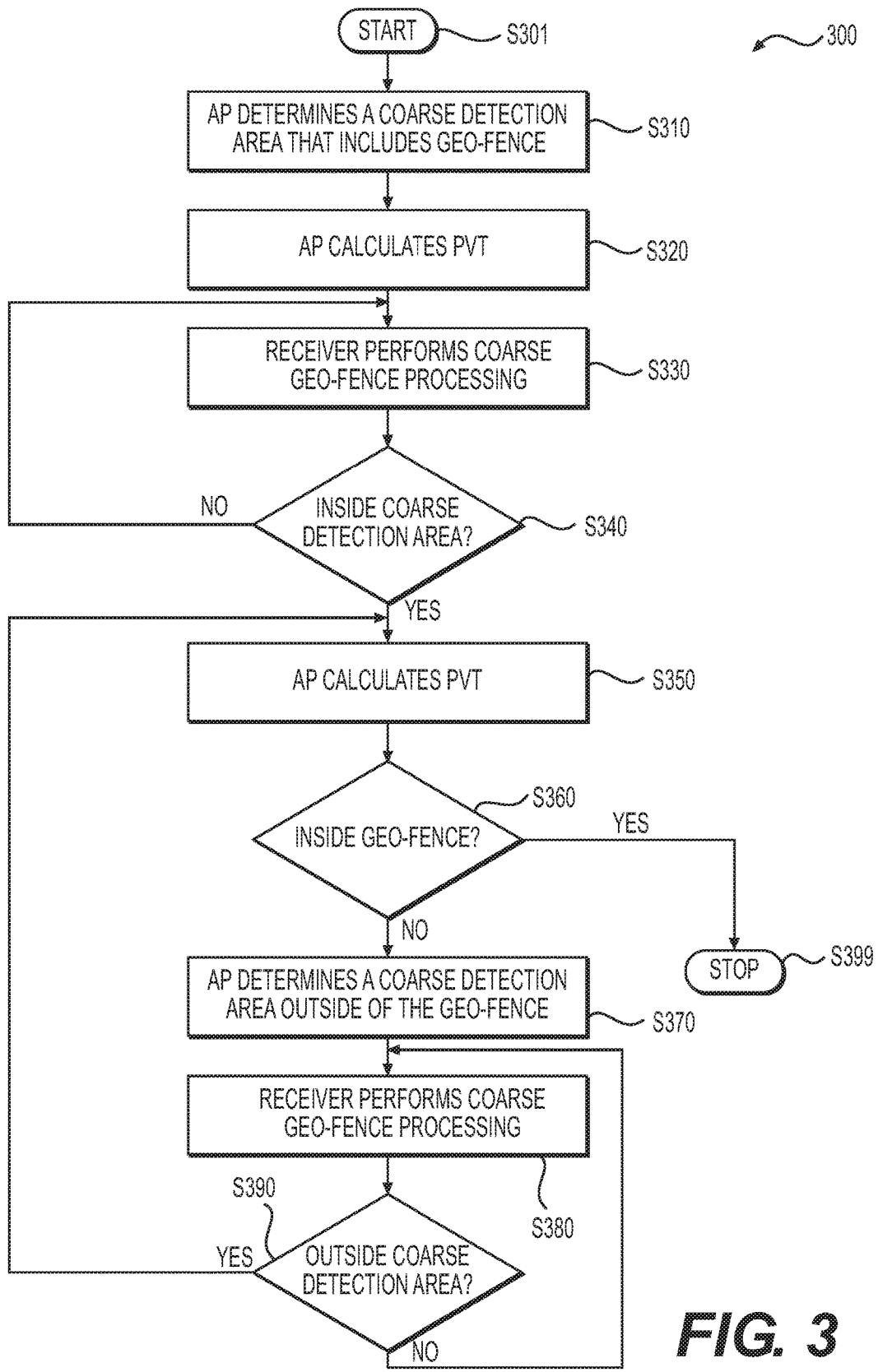
FIG. 3 shows a flow chart outlining a process 300 according to an embodiment of the disclosure.

FIG. 3 shows a flow chart outlining a process 300 according to an embodiment of the disclosure. The process 300 can be implemented in software, firmware, hardware, or any combination thereof. For example, the process 300 can be performed by an electronic device, such as the electronic device 100. In an embodiment, the electronic device 100 executes a geo-fence detection based application. Initially, the electronic device 100 is outside of a geo-fence defined in the application, and the electronic device 100 executes the process 300 to detect a geo-fence event, for example, the electronic device 100 enters the geo-fence. The process starts at S301 and proceeds to S310.

At S310, a coarse detection area that includes the geo-fence is determined. In an example, the application processor 110 executes software instructions of an application, for example, stored in the memory 120. The application includes a pre-defined geo-fence. The geo-fence can have any suitable shape, such as a circle, a rectangle, and the like. The application processor 110 determines a coarse detection area that includes the geo-fence. In an embodiment, the coarse detection area can be, although not limited to, a circle.

At S320, a PVT calculation is performed. In an example, the navigation signal receiver 130 receives signals from a GNSS, suitably processes the signals, and provides the processed signals to the application processor 110. The application processor 110 executes software instructions 125 to perform PVT computation based on the received signals from the GNSS. The application processor 110 calculates various parameters, such as minimum distances between the coarse detection area and the satellites in the GNSS, maximum distances between the coarse detection area and the satellites in the GNSS, the change speed of the minimum distances, the change speed of the maximum distances, the change acceleration of the minimum distances, the change acceleration of the maximum distances and the like. The calculated values can be used as initial values at an initial time when a next coarse geo-fence detection starts, and the calculated values are provided to the navigation signal receiver 130.

At S330, a coarse geo-fence processing is performed without PVT calculation. In an embodiment, the coarse geo-fence detection starts from the initial time with the initial values calculated in S320, then the navigation signal receiver 130 receives signals from a GNSS, and processes the signals for the coarse geo-fence detection. For example, the range acquisition module 140 calculates pseudo-distances from the electronic device 100 to the satellites, and the navigation signal receiver 130 calculates the overlapping of clock skew as discussed with respect to FIG. 2. In another example, the navigation signal receiver 130 calculates the overlapping of clock drift as discussed with respect to FIG. 2.

At S340, the process proceeds based on a determination of whether the electronic device 100 is inside the coarse detection area or outside the coarse detection area. In an example, when the overlapping of clock skew is equal to or larger than zero, the electronic device 100 is inside the coarse detection area; otherwise, the electronic device 100 is outside the coarse detection area. In another example, when the overlapping of the clock drift is equal to or larger than zero, the electronic device 100 is inside the coarse detection area; otherwise, the electronic device 100 is outside the coarse detection area. When the electronic device 100 is in the coarse detection area, the process proceeds to S350; otherwise, the process returns to S330.

At S350, a PVT calculation is performed to calculate accurate position. In an example, the navigation signal receiver 130 receives signals from GNSS, suitably processes the signals, and provides the processed signals to the application processor 110. The application processor 110 executes software instructions 125 to perform PVT computation, and determine the accurate location of the electronic device 100.

At S360, the process proceeds based on a determination of whether the electronic device 100 is inside the geo-fence or not. In an example, the application processor 110 compares the accurate location of the electronic device 100 with the geo-fence defined in the application, and determines whether the electronic device 100 is inside the geo-fence or outside the geo-fence. When the electronic device 100 is outside the geo-fence, the process proceeds to S370. When the electronic device 100 is inside the geo-fence, the geo-event that the electronic device 100 enters the geo-fence is detected, and the electronic device 100 operates in response to the detected geo-fence event, and the process proceeds to S399 and terminates.

At S370, a coarse detection area that is outside of the geo-fence is determined. For example, the coarse detection area is the maximum circle that is outside of the geo-fence and is centered at the electronic device 100. In an embodiment, the application processor 110 uses the location of the electronic device 100 as the center of the coarse detection area, and determines a circle that is outside of the geo-fence and is tangent to the geo-fence defined in the application. In an example, the application processor 110 determines the coarse detection area as a maximum circle that is outside of the geo-fence and intersects with the geo-fence at a single point. Further, in an example, the application processor 110 calculates various parameters, such as minimum distances from the coarse detection area to the satellites in the GNSS, maximum distances from the coarse detection area to the satellites in the GNSS, the change speed of the minimum distances, the change speed of the maximum distances, the change acceleration of the minimum distances, the change acceleration of the maximum distances and the like. The calculated values can be used as initial values at an initial time when a next coarse geo-fence detection starts, and are provided to the navigation signal receiver 130.

At S380, a coarse geo-fence processing is performed without PVT calculation. In an embodiment, the coarse geo-fence detection starts from the initial time with the initial values calculated in S370, then the navigation signal receiver 130 receives signals from GNSS, and processes the signals for the coarse geo-fence detection. For example, the range acquisition module 140 calculates pseudo-distances from the electronic device 100 to the satellites, and the navigation signal receiver 130 calculates the overlapping of clock skew as discussed with respect to FIG. 2. In another example, the navigation signal receiver 130 calculates the overlapping of clock drift as discussed with respect to FIG. 2.

At S390, the process proceeds based on a determination whether the electronic device 100 is inside the coarse detection area or outside the coarse detection area. In an example, when the overlapping of clock skew is equal to or larger than zero, the electronic device 100 is inside the coarse detection area; otherwise, the electronic device 100 is outside the coarse detection area. In another example, when the overlapping of the clock drift is equal to or larger than zero, the electronic device 100 is inside the coarse detection area; otherwise, the electronic device 100 is outside the coarse detection area. When the electronic device 100 is outside the coarse detection area, the process returns to S350; and when the electronic device 100 is inside the coarse detection area, the process returns to S380.

In an embodiment, when the navigation signal receiver 130 repetitively performs the coarse geo-fence detection, the application processor 110 is idle and enters a power saving mode to save power.

Figure 4:
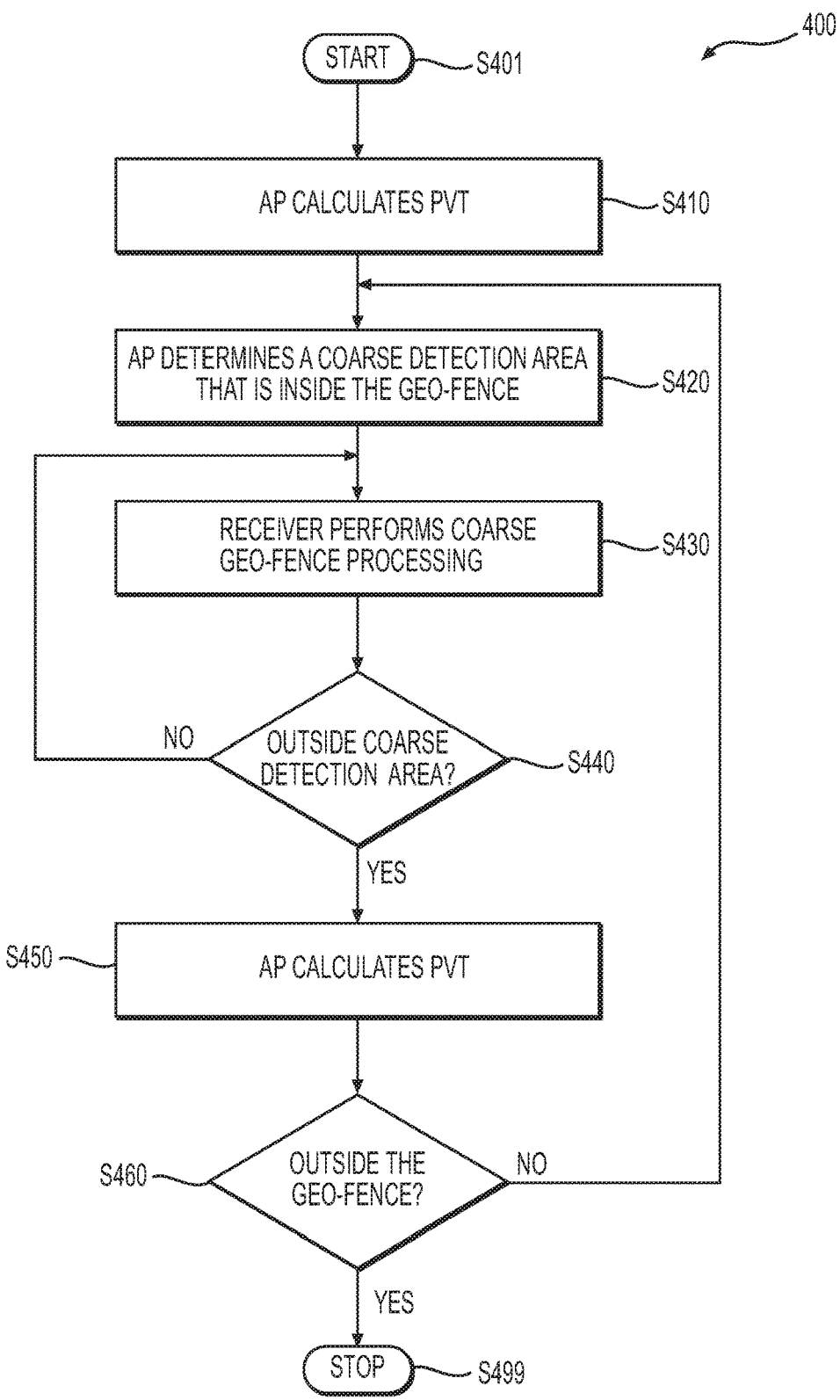
FIG. 4 shows a flow chart outlining a process 400 according to an embodiment of the disclosure.

FIG. 4 shows a flow chart outlining a process 400 according to an embodiment of the disclosure. The process 400 can be implemented in software, firmware, hardware, or any combination thereof. For example, the process 400 can be performed by an electronic device, such as the electronic device 100. In an embodiment, a geo-fence detection based application is executed in the electronic device 100. Initially, the electronic device 100 is inside a geo-fence defined in the application, and the electronic device 100 executes the process 400 to detect a geo-fence event that the electronic device 100 exits the geo-fence. The process starts at S401 and proceeds to S410.

At S410, a PVT calculation is performed. In an example, the navigation signal receiver 130 receives signals from GNSS, suitable processes the signals, and provides the processed signals to the application processor 110. The application processor 110 executes software instructions 125 to perform PVT computation.

At S420, a coarse detection area that is inside the geo-fence is determined. In an embodiment, the coarse detection area is a circle. The application processor 110 uses the location of the electronic device 100 as a center of the circle, and determines the circle inside the geo-fence. In an example, the application processor 110 determines a maximum circle that is inside of the geo-fence and intersects with the geo-fence at a single point to be the coarse detection area. Further, the application processor 110 calculates various parameters, such as minimum distances from the coarse detection area to the satellites in the GNSS, maximum distances from the coarse detection area to the satellites in the GNSS, the change speed of the minimum distances, the change speed of the maximum distances, the change acceleration of the minimum distances, the change acceleration of the maximum distances and the like. The calculated values can be used as initial values at an initial time in a coarse geo-fence detection, and are provided to the navigation signal receiver 130.

At S430, a coarse geo-fence processing is performed without PVT calculation. In an embodiment, the navigation signal receiver 130 receives signals from a GNSS at a time later than the initial time, and processes the signals for the coarse geo-fence processing. For example, the range acquisition module 140 calculates pseudo-distances from the electronic device 100 to the satellites, and the navigation signal receiver 130 calculates the overlapping of clock skew as discussed with respect to FIG. 2. In another example, the navigation signal receiver 130 calculates the overlapping of clock drift as discussed with respect to FIG. 2.

At S440, the process proceeds based on a determination whether the electronic device 100 is outside the coarse detection area or inside the coarse detection area. In an example, when the overlapping of clock skew is equal to or larger than zero, the electronic device 100 is inside the coarse detection area; otherwise, the electronic device 100 is outside the coarse detection area. In another example, when the overlapping of the clock drift is equal to or larger than zero, the electronic device 100 is inside the coarse detection area; otherwise, the electronic device 100 is outside the coarse detection area. When the electronic device 100 is outside the coarse detection area, the process proceeds to S450; otherwise, the process returns to S430.

At S450, a PVT calculation is performed to calculate accurate position. In an example, the navigation signal receiver 130 receives signals from the GNSS, suitably processes the signals, and provides the processed signals to the application processor 110. The application processor 110 executes software instructions 125 to perform PVT computation, and determine the accurate location of the electronic device 100.

At S460, the process proceeds based on a determination of whether the electronic device 100 is inside the geo-fence or not. In an example, the application processor 110 compares the accurate location of the electronic device 100 with the geo-fence defined in the application, and determines whether the electronic device 100 is inside the geo-fence or outside the geo-fence. When the electronic device 100 is inside the geo-fence, the process returns to S420. When the electronic device 100 is outside the geo-fence, the geo-event that the electronic device 100 exits the geo-fence is detected, and the electronic device 100 operates in response to the detected geo-fence event, and the process proceeds to S499 and terminates.

In an embodiment, when the navigation signal receiver 130 repetitively performs the coarse geo-fence detection, the application processor 110 is idle and enters a power saving mode to save power.

Figure 5:
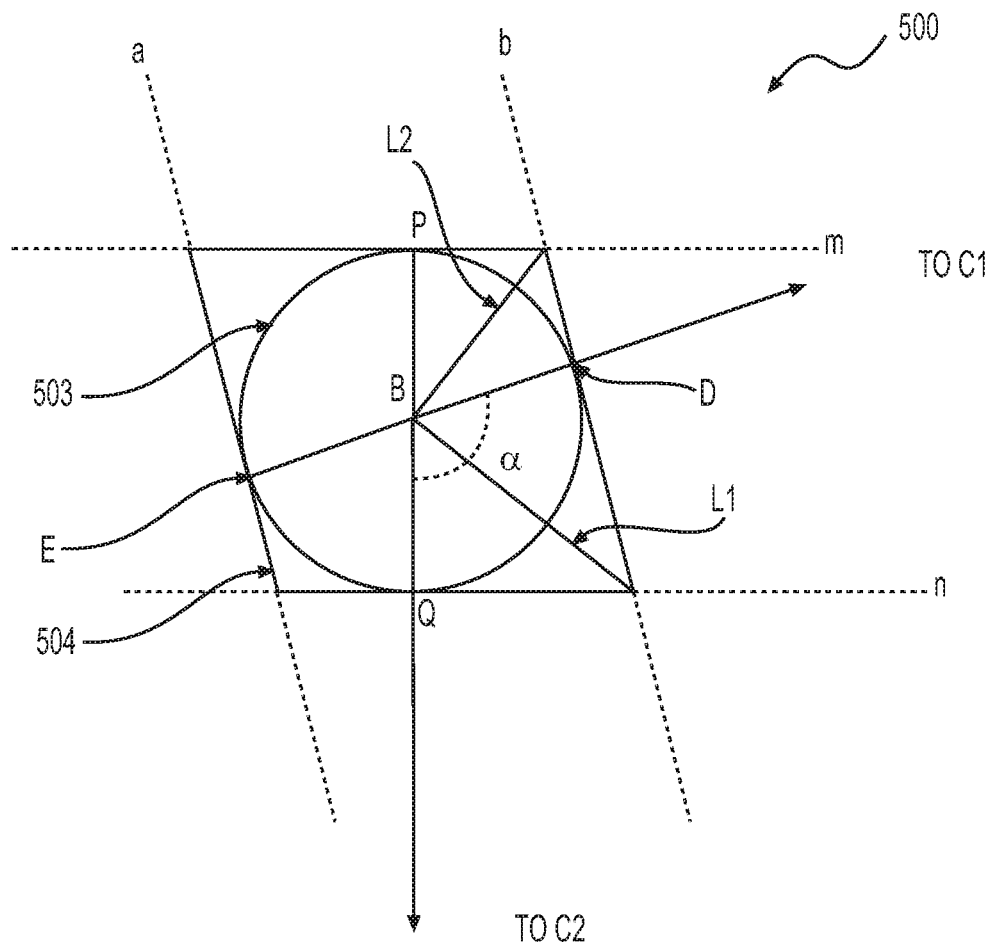
FIG. 5 shows a plot 500 for determining a detection area according to an embodiment of the disclosure.

FIG. 5 shows a plot 500 for illustrating a method to determine a coarse detection area according to an embodiment of the disclosure. In an example, the method is used in S310 to determine a coarse detection area that includes a geo-fence.

The plot 500 shows a geo-fence 503. The geo-fence 503 is a circle with a center at point B. The radius of the geo-fence 503 is represented by R. C1 is a vertical projection point of a first satellite and C2 is a vertical projection point of a second satellite on the plane of the geo-fence 503. Further, point D is a near cross point of line BC1 and the circle 503, and point E is a far cross point of line BC1 and the circle 503. Inside the geo-fence 503, point E has a maximum distance to the first satellite, and point D has a minimum distance to the first satellite. An arc a is a segment of a first circle with the same distance as point E to the first satellite, and an arc b is a segment of a second circle with the same distance as point to first satellite.

Similarly, inside the geo-fence 503, point P has a maximum distance to the second satellite, and point Q has a minimum distance to the second satellite. An arc m is a segment of a third circle with the same distance as point P to the second satellite, and an arc n is a segment of a fourth circle with the same distance as point Q to the second satellite. An angle α is the difference of the azimuth of first satellite and the second satellite.

According to an aspect of the disclosure, orbit height of the GNSS satellites are tens of thousands of kilometers, and generally, the radius R is much smaller than C1-D and C1-E. Thus, the arc a and the arc b are approximately parallel lines. Similarly, the arc m and the arc n are approximately parallel lines. Thus, the arc a, arc h, arc m and arc n form a diamond shape 504 that covers the geo-fence 503. In an example, L1 and L2 are half of the diagonal lines in the diamond shape 504, and can be calculated according to equations 14 and 15, and the maximum value of L1 and L2 is represented by L as shown in equation 16.

$$L1 = R/\cos(\alpha/2) \tag{14}$$

$$L2 = R/\sin(\alpha/2) \tag{15}$$

$$L = \max(L1, L2) \tag{16}$$

According to an aspect of the disclosure, a coarse detection area can be formed by a circle with point B as a center and L as a radius, and the coarse detection area fully covers the geo-fence 503. It is noted that when α approaches to 90 degree, L becomes smaller.

In an embodiment, when an electronic device, such as the electronic device 100 receives navigation signals from multiple satellites, the electronic device is configured to select two satellites from the multiple satellites. In an example, the difference angle of the two azimuths for the two satellites is close to 90 degree and the elevation of two satellites is not close to 90 degree. Then, based on the selected satellites, the electronic device calculates a radius L according to equations 14-16. The electronic device determines a circle as the coarse detection area, the center of the circle is the same as the geo-fence 503, and the radius of the circle is L.

Figure 6:
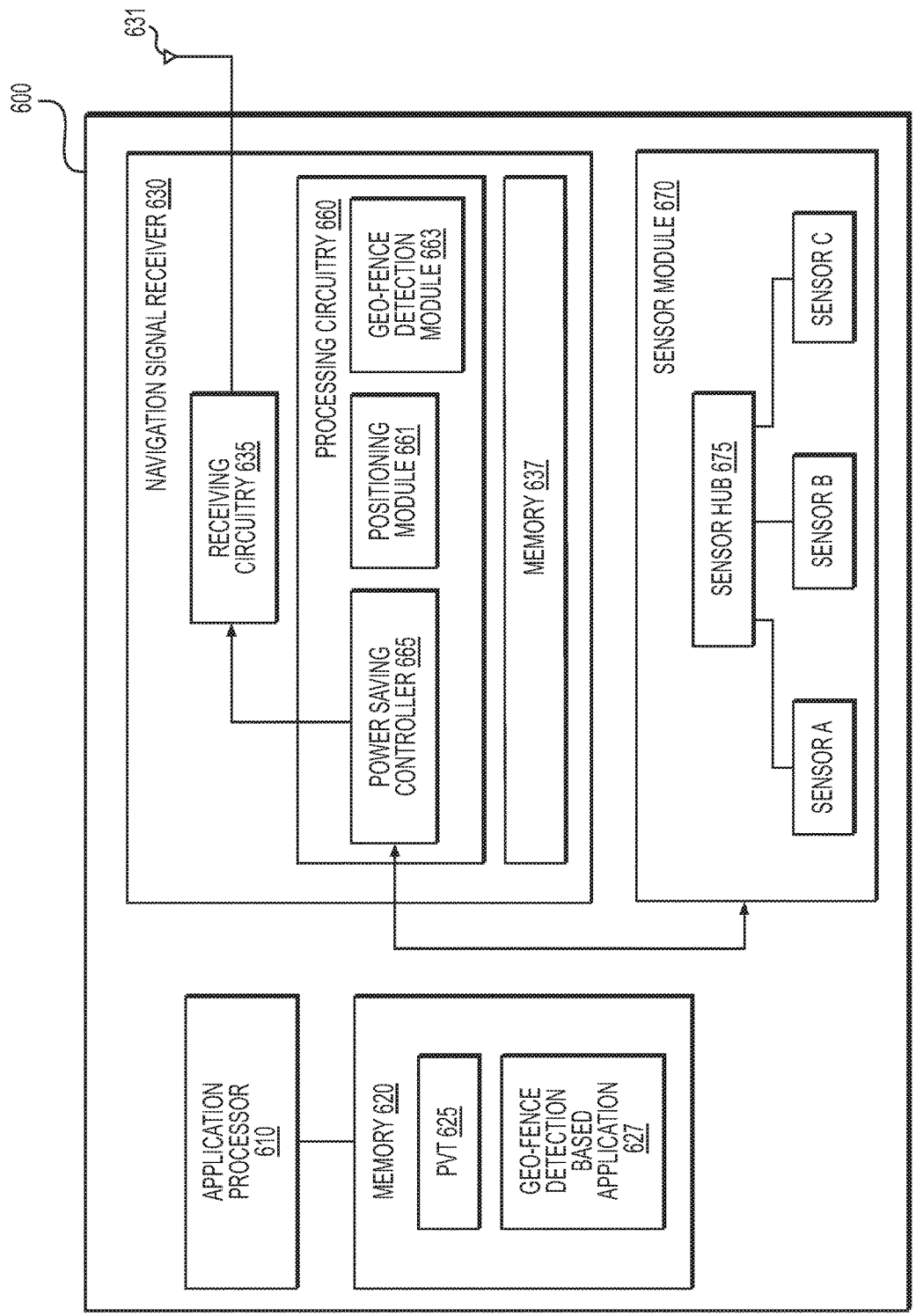
FIG. 6 shows a block diagram of an electronic device 600 according to an embodiment of the disclosure.

FIG. 6 shows a block diagram of an electronic device 600 according to an embodiment of the disclosure. The electronic device 600 includes a navigation signal receiver 630 configured to receive and process signals from a satellite navigation system. Further, the navigation signal receiver 630 is configured to have multiple operation modes, such as a power saving mode and a normal operation mode. The navigation signal receiver 630 includes a power saving controller 665 configured to calibrate a moving speed of the electronic device 600 based on sensor signals, determine a power-saving time based on the calibrated moving speed, and control the navigation signal receiver 630 to stay in the power saving mode for the power-saving time.

Similar to the electronic device 100, the electronic device 600 can be any suitable device, such as a tablet computer, a smart phone, a camera, a wearable device, and the like. The electronic device 600 is configured to execute an application that requires geo-fence detection.

In an example, the electronic device 600 is a smart phone 600 belonging to a user who has subscribed an information service from a business owner. The smart phone 600 executes a mobile application, for example provided by the business owner. The mobile application includes a geo-fence defined around a geographic area, such as a circular boarder around a building of the business owner and the like, and the smart phone 600 detects a geo-fence event, such as entering the geo-fence, exiting the geo-fence. When the user with the smart phone 600 enters or exits the geographic area, the smart phone 600 detects the geo-fence event, and informs a server (not shown) that provides the information service. In an example, the server provides a push notification to the smart phone 600 in response to a geo-fence event.

In another example, the electronic device 600 is a wearable device 600 that can be attached to a child. In an embodiment, the wearable device 600 executes an application having a geo-fence defined around a geographic area, such as a border around a day care center, and the like, and the wearable device 600 detect a geo-fence event, such as exiting the day care center. In an example, when a child is dropped off at the day care center, the wearable device 600 is attached to the child and is activated. When the child exits the day care center by accident in an example, the wearable device 600 detects the geo-fence event, and operates in response to the geo-fence event. In an example, the wearable device 600 sends out audio alarm. In another example, the wearable device 600 transmits wireless signals that can generate alarm signals, for example, on a monitoring device of the day care center and/or a mobile device with the child's parent.

According to an aspect of the disclosure, unlike the electronic device 100, the electronic device 600 does not perform geo-fence detection at a fixed frequency. Instead, the electronic device 600 is configured to determine a power-saving time based on a moving speed. In an example, the moving speed is calibrated with a relatively high accuracy, and the power-saving time is determined to ensure no geo-fence event during the power-saving time. Thus, the electronic device 600 can enter a power saving mode during the power-saving time to save power and the electronic device 600 can achieve relatively high power efficiency and relatively accurate geo-fence event detection.

In the FIG. 6 example, the electronic device 600 includes the navigation signal receiver 630, an application processor 610, a sensor module 670 coupled together.

The application processor 610 is configured to be able to execute various applications. The electronic device 600 includes a memory 620 storing software instructions of applications, and the application processor 610 can executes the software instructions to run the applications on the electronic device 600. In the FIG. 6 example, the memory 620 stores software instructions 625 for PVT calculation. The application processor 610 can execute the software instructions 625 to receive information from the navigation signal receiver 630, calculate position, velocity and time, determine the location of the electronic device 600, and can perform location based applications. Further, in the FIG. 6 example, the memory 620 stores software instructions 627 for a geo-fence detection based application, such as an advertisement service application, a child location service application, and the like.

In an embodiment, the electronic device 600 is a battery-powered device. In order to save power, the application processor 610 is configured to have an active mode and a power saving mode. In the active mode, the application processor 610 is able to execute software instructions. When the application processor 610 is idle, the application processor 610 enters the power saving mode to save power.

The sensor module 670 includes multiple sensors A-C configured to detect various parameters. In the FIG. 6 example, the sensor module 670 includes a sensor hub 675 configured to collect sensor signals and process the sensor signals. In an example, the sensor hub 670 is implemented using microcontroller circuits to process the sensor signals. In an example, the sensor A includes one or more accelerometers configured to measure acceleration, and the sensor B includes one or more gyroscopes configured to detect three-dimensional orientation. The sensor module 670 can include other suitable sensors, such as thermometers, barometers and the like. In the FIG. 6 example, the sensor hub 675 can receive sensor signals from the multiple sensors A-C, and perform suitable processing based on the sensor signals. In an example, the sensor hub 675 detects a walking step from the sensor signals, and accumulates a step count based on the walking step detection. The sensor module 670 can provide the step count to the navigation signal receiver 630.

It is noted that, in another example, the sensor module 670 does not include the sensor hub 675, and the sensor signals are provided to the navigation signal receiver 630 to detect the walking steps and accumulate the step count.

According to an aspect of the disclosure, the sensor module 670 is configured to have multiple operation modes of different power consumption, such as a turn-on mode (a normal operation mode), a turn-off mode (a power saving mode), and the like. In an example, the sensor module 670 enters one of the operation modes in response to a control signal from the navigation signal receiver 630.

In the FIG. 6 example, the navigation signal receiver 630 includes receiving circuitry 635, processing circuitry 660, and a memory 637. The receiving circuitry 635 is configured to receive and process satellite navigation signals. The processing circuitry 660 is configured to process the satellite navigation signals, calculate position information, detect geo-fence events, and control the operation modes of the various components of the electronic device 600. The memory 637 is configured to store software instructions and data during processing.

In the FIG. 6 example, the electronic device 600 includes an antenna 631 configured to generate electrical signals in response to electromagnetic waves in the air. In an embodiment, the antenna 631 is configured to generate satellite navigation signals in response to electromagnetic waves emitted by satellites in a satellite navigation system. In an example, a global navigation satellite system (GNSS) includes multiple satellites (not shown) that provide a global coverage on the Earth. Each satellite transmits electromagnetic waves carrying ephemeris for the satellite, such as a code designated for the satellite. In an embodiment, the code can be used to determine a distance from the electronic device 600 to the satellite, and the distance is used in position calculation and the geo-fence detection.

It is noted that the GNSS can be any suitable satellite system, such as the Global Positioning System (GPS), the GLObalnaja NAvigatsionnaja Sputnikovaja Sistema (GLONASS) satellite system, the Galileo navigation satellite system, the Beidou navigation satellite system, and the like.

The receiving circuitry 635 is coupled to the antenna 631 to receive an electrical signal generated in response electromagnetic waves in the air. The receiving circuitry 635 includes suitable circuits to process the electrical signal and obtain a digital signal from the electrical signal. In an example, the receiving circuit 635 includes various analog circuits (not shown), such as amplifier, filter, down-converter and the like to process the electrical signal using analog processing techniques. In addition, the receiving circuitry 635 includes an analog-to-digital converter (ADC) (not shown) that converts the processed analog signal to a digital signal. From the digital signal, a digital sequence, such as a binary sequence, can be obtained. In an example, the digital sequence includes codes designated for multiple satellites.

According to an aspect of the disclosure, the receiving circuitry 635 requires a relatively large power to acquire and track satellite in view, and is power consuming during active operation. Thus, in an embodiment, the receiving circuitry 635 is configured to have multiple operation modes, such as a turn-on mode and turn-off mode, and can be controlled to turn on/off. When the receiving circuitry 635 is turned on, the navigation signal receiver 630 enters a normal operation mode to acquire and track satellite in view, and when the receiving circuitry 635 is turned off, the navigation signal receiver 630 enters a power saving mode to save power.

In an embodiment, the processing circuitry 660 is configured to include a plurality of functional modules, such a positioning module 661, a geo-fence detection module 663, the power saving controller 665 and the like. The positioning module 661 is configured to calculate position information, such as a position fix, horizontal uncertainty, a velocity, time and the like, based on the processed satellite navigation signals. The geo-fence detection module 663 is configured to detect geo-fence event when the electronic device 600 crosses a geo-fence, such as entering the geo-fence, exiting the geo-fence and the like.

In an embodiment, the processing circuitry 660 is implemented using a central processing unit (CPU). The CPU can execute instructions stored in the memory 637 to perform the various functions, such as the position calculation function, the geo-fence detection function, the power saving control function and the like. In another embodiment, the processing circuitry 660 is implemented using functional circuits to perform the various functions.

It is noted that the positioning module 661 can determine the position information using any suitable technique. In an example, the positioning module 661 is configured to perform PVT calculation based on satellite navigation signals to determine the positioning information. In another example, the positional module 661 provides measurement data to the application processor 610 to perform the PVT calculation, and receives the calculated positional information from the application processor 610.

The geo-fence detection module 663 is configured to detect a geo-fence event when the electronic device 600 crosses a geo-fence, such as entering the geo-fence, exiting the geo-fence and the like. In an example, a geo-fence area is defined as a circular area with a center, then the geo-fence detection module 663 can calculate a distance between the position of the electronic device 600 and the center of the geo-fence area. When the distance is larger than the radius of the geo-fence area, the electronic device 600 is out of the geo-fence, and when the distance is smaller than the radius of the geo-fence area, the electronic device 600 is in the geo-fence. When the distance is about the radius of the geo-fence area, the electronic device 600 may cross the geo-fence. The geo-fence detection module 663 can generate a signal indicative of the relationship of the position of the electronic device 600 to the geo-fence.

The power saving controller 665 is configured to determine a power-saving time during which no geo-fence event is expected, such that the navigation signal receiver 630 can stay in the power saving mode for the power-saving time to save power. In an example, the power saving controller 665 determines a distance between the electronic device 600 and a nearest point on the geo-fence, then based on the moving speed of the electronic device 600, the power saving controller 665 calculates a shortest time for the electronic device 600 to arrive at the nearest point on the geo-fence border. Based on the shortest time, the power saving controller 665 can determine the power saving time. For example, the power saving controller 665 can use the shortest time as the power saving time.

According to an aspect of the disclosure, the velocity determined by the positioning module 661 may not be accurate. In an example, when the electronic device 600 moves at a relatively slow speed, for example, when the owner of the electronic device 600 takes a walk, the velocity calculated by the positioning module 661 has a relatively large error. Then, when the power saving controller 665 uses a speed determined solely based on the velocity calculated by the positioning module 661, the power saving time may be determined to be too long to miss a geo-fence event, or may be determined to be too short to make the navigation signal receiver 630 to be less power efficient.

According to an embodiment of the disclosure, the power saving controller 665 uses other suitable information, such as sensor information, and the like to calibrate the moving speed of the electronic device 600 to be more accurate, thus the power saving controller 665 can more accurately determine the power saving time, such that the navigation signal receiver 630 is more power efficient and does not miss any geo-fence event.

In the FIG. 6 example, the power saving controller 665 can receive a sensor signal from the sensor module 670 that is indicative of a motion mode of the electronic device 600. In an example, the sensor hub 675 collects sensor signals from the sensors A-C, determines motion mode based on the sensor signals, and provides a sensor signal indicative of the motion mode to the power saving controller 665. In an example, when the sensor signals from accelerometers match characteristics of walking steps, the sensor hub 675 determines that the electronic device 600 is in a slow motion mode. Further, the sensor module 670 can provide a step count information to the power saving controller 665.

In an embodiment, when the velocity determined by the positioning module 661 is in a reasonable range for moving cars, the power saving controller 665 determines that the electronic device 600 is in a fast moving mode, and the power saving controller 665 relies more on the velocity information determined by the positioning module 661 to calibrate the moving speed of the electronic device 600. When the velocity has abnormal variation not reasonable for moving cars, and the sensor signal from the sensor module 670 is indicative of the slow motion mode, the power saving controller 665 can rely more on the step count information from the sensor module 670 to calibrate the moving speed of the electronic device 600.

In an embodiment, the navigation signal receiver 630, the application processor 610 and the sensor module 670 are implemented on different integrated circuit (IC) chips. In another embodiment, the navigation signal receiver 630, the application processor 610 and the sensor module 670 are implemented as circuit blocks integrated on an IC chip.

Figure 7:
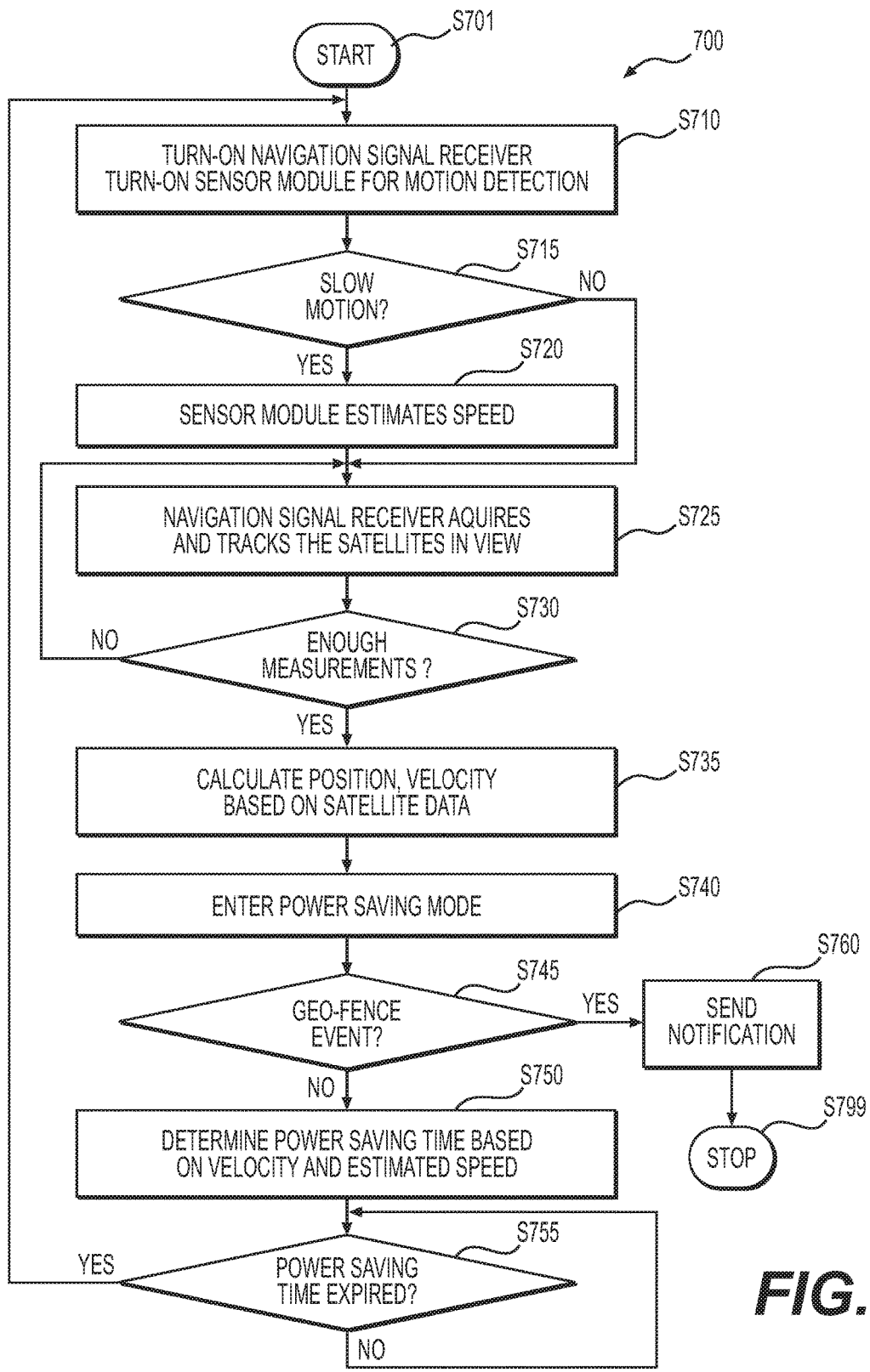
FIG. 7 shows a flow chart outlining a process 700 according to an embodiment of the disclosure.

FIG. 7 shows a flow chart outlining a process 700 according to an embodiment of the disclosure. In an embodiment, the process 700 is executed by components in the electronic device 600. The process starts at S701 and proceeds to S710.

At S710, the navigation signal receiver 630 is turned on and the sensor module 670 is turned on. In an embodiment, the receiving circuitry 635 is turned on to receive satellite navigation signals, and one or more sensors A-C generate sensor signals, and provide sensor signals to the sensor hub 675.

At S715, the motion mode of the electronic device 600 is determined. In an example, the sensor hub 675 receives sensor signals from sensors A-C, and determines whether the sensor signals match characteristics for walking steps. When the sensor signals match the characteristics of walking steps, the sensor hub 675 sends a signal indicative of the slow motion mode of the electronic device 600. When the electronic device 600 is in the slow motion mode, the process proceeds to S720. When the sensor signals do not match the characteristics of walking steps, in an example, the sensor hub 675 sends a signal indicative of a fast motion mode, then the sensor module 670 enters a power saving mode, and process proceeds to S725.

At S720, the sensor module 670 collects sensor data, and estimates a moving speed. For example, sensor module 670 can cumulate the step count during a time period that the navigation signal receiver 630 uses to acquire satellite signals and make a first position determination. In an example, the time period is referred to as a time to first fix. In an embodiment, using the cumulated step count, the sensor module 670 can determine a displacement. Further, the sensor module 670 estimates the moving speed according to the displacement and the time to first fix.

At S725, the navigation signal receiver 630 acquires satellite signals and tracks the satellites in view. In an example, the steps S720 and S725 are performed at the same time by the sensor module 670 and the navigation signal receiver 630.

At S730, the power saving controller 665 determines whether the navigation signal receiver 630 has obtained enough measurement. When the navigation signal receiver 630 obtained enough measurement, the process proceeds to S735; otherwise, the process returns to S725 to continue tracking the satellites in view.

At S735, the navigation signal receiver 630 calculates position information, such as a position fix, horizontal uncertainty, a velocity and the like.

At S740, the navigation signal receiver 630 enters a power saving mode. In an example, the power saving controller 665 sends a control signal to the receiving circuitry 635 to turn off the receiving circuitry 635 in order to save power.

At S745, the navigation signal receiver 630 determines whether a geo-fence event happens. In an example, the navigation signal receiver 630 calculates a distance D from the electronic device 600 to a center point of the geo-fence area. Then, the navigation signal receiver 630 compares the distance D with a radius of the geo-fence to determine whether the electronic device 600 is in the geo-fence or out of the gee-fence. In an embodiment, when the electronic device 600 is now in the geo-fence, and previously out of the geo-fence, the electronic device 600 enters the gee-fence; when the electronic device 600 is now out of the gee-fence, and previously in the geo-fence area, the electronic device 600 exits the geo-fence. In another embodiment, when the distance D is about the same as the radius of the gee-fence, a geo-fence event is detected. When a gee-fence event is detected, the process proceeds to S760; otherwise, the process proceeds to S750.

At S750, the power saving controller 665 determines a power saving time. In an example, when the electronic device 600 is in the fast motion mode, the velocity calculated by the positioning module 661 is relatively accurate. The power saving controller 665 determines the moving speed based on the velocity, and determines the power saving time based on the moving speed. In another example, when the electronic device 600 is in the slow motion mode, the power saving controller 665 uses the estimated moving speed provided by the sensor module 670 to determine the power saving time. In an example, the power saving controller 665 determines a distance from the electronic device 600 to a nearest point of the geo-fence, and calculates a time prediction for the electronic device 600 to arrive at the nearest point using the moving speed. Then the power saving controller 665 can determine the power saving time based on the time prediction.

At S755, the power saving controller 665 determines whether the power saving time expires. In an example, when the navigation signal receiver 630 enters the power saving mode, the power saving controller 665 starts tracking time. When the power saving time is expired, the process proceeds to S710 to turn on the receiving circuitry 635 and the sensor module 670; otherwise, the process returns to S755 to wait for power saving time to expire.

At S760, the navigation signal receiver 630 sends notification signal to the application processor 610. The application processor 610 then operates accordingly. The process proceeds to S799 and terminates.

It is noted that the process 700 can be suitably modified. In an example, the step S735 can be executed after S740. In another example, the steps 720 and S725 are performed at the same time.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A circuit for geo-fence detection, the circuit comprising:
   receiver circuitry configured to receive satellite navigation signals from a plurality of satellites; and
   processor circuitry configured to:
   determine a velocity of the circuit based on the satellite navigation signals received from the plurality of satellites,
   receive an estimated speed of the circuit from a sensor module,
   calibrate a moving speed of the circuit based on the velocity and the estimated speed, wherein the calibration relies more on the satellites than the sensor module when the circuit is in a fast motion and the calibration relies more on the sensor module than the satellites when the circuit is in a slow motion,
   determine a power saving time based on the calibrated moving speed, wherein the power saving time is an amount of time that the circuit is to stay in a power saving mode,
   determine a position of the circuit based on the received satellite navigation signals, and detect a geo-fence event when the circuit crosses a border of a geo-fence area based on the position, and
   calculate a distance between the position and a center position of the geo-fence area, and determine whether the circuit is in or out of the geo-fence area.

2. The circuit of claim 1, wherein the processor circuitry is configured to turn off the receiver circuitry in the power saving mode.

3. The circuit of claim 1, wherein the processor circuitry is configured to detect the slow motion of the circuit based on a signal from the sensor module, and calibrate the moving speed based on the estimated speed from the sensor module.

4. The circuit of claim 1, wherein the processor circuitry is configured to predict, based on the calibrated moving speed, a time duration without the geo-fence event, and determine the power saving time based on the time duration.

5. The circuit of claim 1, wherein the processor circuitry is configured to signal an application processor when the circuit crosses the border of the geo-fence area.

6. A method for geo-fence detection, the method comprising:
   detecting a motion mode of a device;
   receiving an estimated speed of the device from a sensor module in the device;
   calibrating a moving speed of the device in the motion mode based on a velocity and the estimated speed from the sensor module, the velocity being determined based on satellite navigation signals from satellites, wherein the calibration relies more on the satellites than the sensor module when the motion mode is a fast motion mode and the calibration relies more on the sensor module than the satellites when the motion mode is in a slow motion mode;

determining a power saving time based on the calibrated moving speed, wherein the power-saving time is an amount of time that the device is to stay in a power saving mode;

determining a position of the device based on the satellite navigation signals, and detect a geo-fence event when the device crosses a border of a geo-fence area based on the position; and calculating a distance between the position and a center position of the geo-fence area, and determine whether the device is in or out of the geo-fence area.

7. The method of claim 6, further comprising:
turning off a receiver circuitry in the power saving mode, wherein the receiver circuitry receives the satellite navigation signals in an active mode.

8. The method of claim 6, wherein
detecting the slow motion mode of the device based on a signal from the sensor module; and
calibrating the moving speed based on the estimated speed from the sensor module when the device is in the slow motion mode.

9. The method of claim 6, wherein determining the power-saving time based on the calibrated moving speed further comprises:
predicting, based on the calibrated moving speed, a time duration without the geo-fence event; and
determining the power saving time based on the time duration.

10. The method of claim 6, wherein detecting the geo-fence event when the device crosses the border of the geo-fence area based on the position further comprises:
comparing the distance with a radius of the geo-fence to determine whether the device is in/out of the geo-fence area.

11. An apparatus, comprising:
a sensor module configured to generate signals indicative of motions of the apparatus; and
a navigation signal receiver that includes
receiver circuitry configured to receive satellite navigation signals from a plurality of satellites; and
processor circuitry configured to:
determine a velocity of the apparatus based on the satellite navigation signals received from the plurality of satellites,
receive an estimated speed of the apparatus from the sensor module,
calibrate a moving speed of the apparatus based on the velocity and the estimated speed, wherein the calibration relies more on the satellites than the sensor module when the circuit is in a fast motion and the calibration relies more on the sensor module than the satellites when the circuit is in a slow motion,
determine a power saving time based on the calibrated moving speed, wherein the power saving time is an amount of time that the navigation signal receiver is to stay in a power saving mode,
determine a position of the apparatus based on the received satellite navigation signals, and detect a geo-fence event when the apparatus crosses a border of a geo-fence area based on the position, and
calculate a distance between the position and a center position of the geo-fence area, and determine whether the apparatus is in or out of the geo-fence area.

12. The apparatus of claim 11, wherein the processor circuitry is configured to turn off the receiver circuitry in the power saving mode.

13. The apparatus of claim 11, wherein the processor circuitry is configured to detect the slow motion of the apparatus based on a signal from the sensor module, and calibrate the moving speed based on the estimated speed from the sensor module.

14. The apparatus of claim 11, wherein the processor circuitry is configured to predict, based on the calibrated moving speed, a time duration without the geo-fence event, and determine the power saving time based on the time duration.

15. The apparatus of claim 11, wherein the processor circuitry is configured to signal an application processor when the apparatus crosses the border of the geo-fence area.

* * * * *